_United States Patent Office_

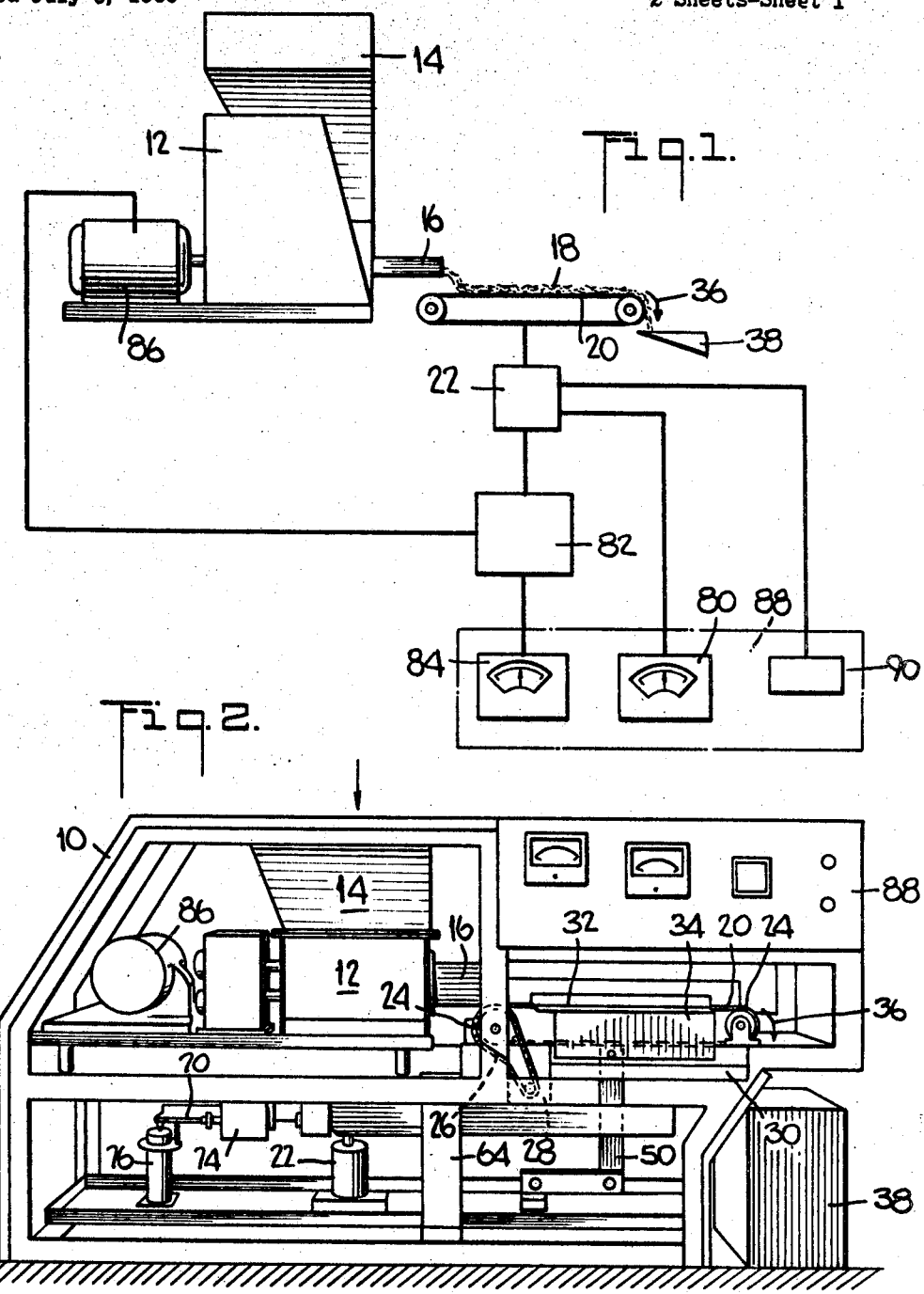

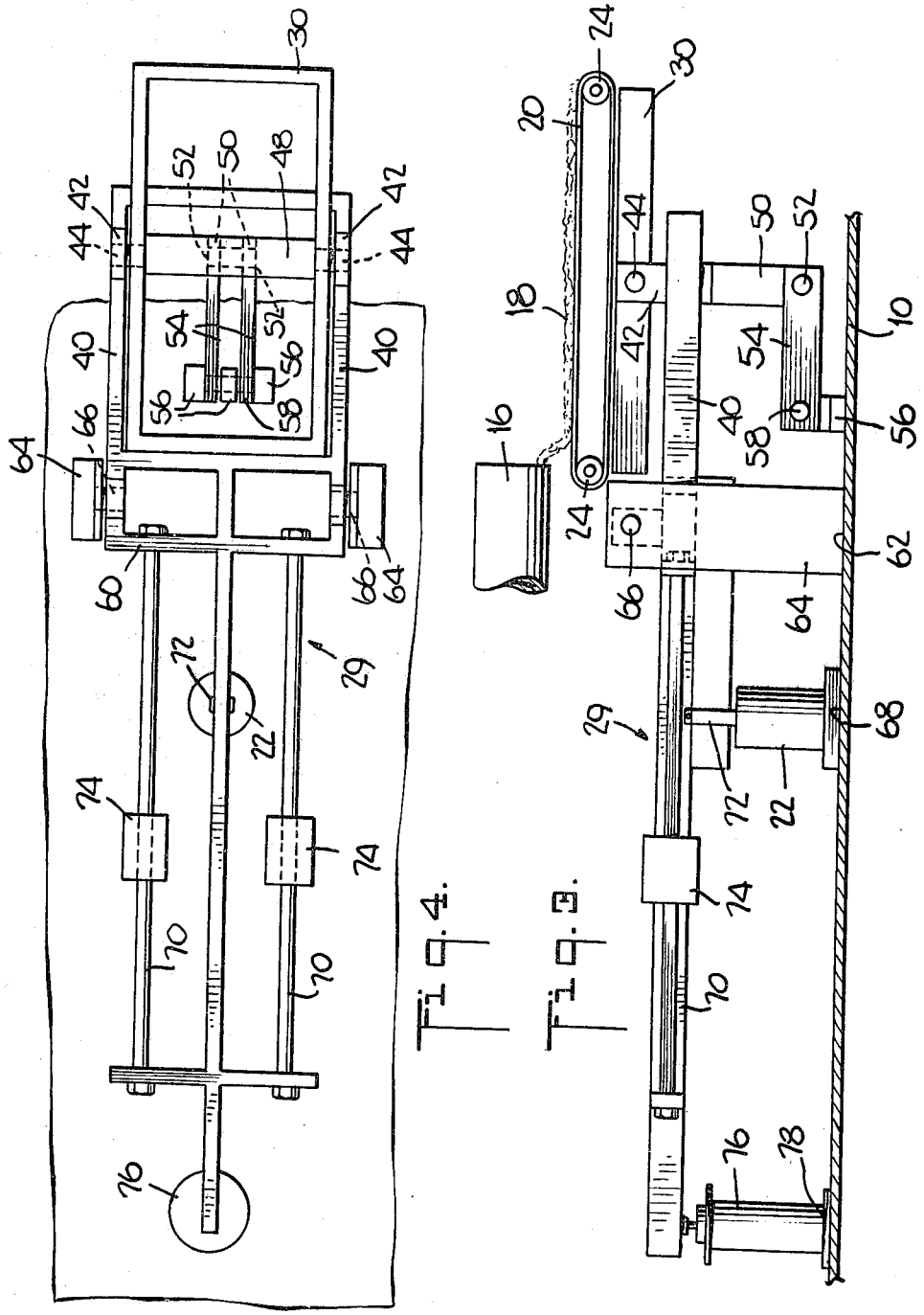

3,494,507
Patented Feb. 10, 1970

3,494,507
METERING APPARATUS
Ronald J. Ricciardi, 121 Dayton Ave.,
Garfield, N.J. 07026
Filed July 5, 1966, Ser. No. 562,721
Int. Cl. B67d 5/08
U.S. Cl. 222—36    2 Claims

ABSTRACT OF THE DISCLOSURE

Apparatus for feeding particulate solid material including a prefeeder, an endless belt for receiving the output of the prefeeder at one end and discharging the material at the other end thereof, weighing means for weighing the endless belt with the material thereon, and controls for varying the flow of the prefeeder responsive to the weight.

This invention relates to equipment for handling particulate solid material and more particularly to apparatus for metering and feeding said material.

Apparatus constructed according to my invention is particularly adapted among other possible uses for accurately metering and feeding a wide variety of dry materials regardless of whether the material is free-flowing, sluggish, or pressure sensitive; and ranging from amorphous powders to flakes, pellets, chunks and even fibers.

Briefly, the present invention contemplates the provision of new and improved apparatus for feeding particulate solid material comprising a main frame, a volumetric prefeeder, and means for varying the volumetric output of the prefeeder. Further, the apparatus comprises endless conveyor belt means carried by the frame and adapted for receiving the output of the prefeeder at one end thereof and for discharging the material from the other end thereof. Weighing means are provided for the endless conveyor belt means and control means responsive to the weighing means are provided for controlling the means for varying the volumetric output of the prefeeder.

A feature of the invention resides in the provision of a new and improved apparatus for feeding particulate solid material which is capable of continuous operation or batch type operation, which has a high degree of accuracy, for example, of the order of plus or minus one-half percent to one percent of the set rate as measured by weight, and which is good for proportioning various components which may be intermixed one with the other.

Another feature of this invention is the provision of a new and improved apparatus for feeding particulate solid material which has the ability to handle a wide variety of materials having different physical or chemical characteristics.

According to the present invention, as another feature thereof there is provided apparatus for feeding dry comminuted materal which is economical, compact, efficient, safe and reliable in operation.

There has thus been outlined rather broadly the more important features of the invention in order that the detailed description thereof that follows may be better understood, and in order that the present contribution to the art may be better appreciated. There are, of course, additional features of the invention that will be described hereinafter which will form the subject of the claims appended hereto. Those skilled in the art will appreciate that the conception on which this disclosure is based may readily be utilized as the basis for the designing of other structures for carrying out the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings, forming a part of the specification, wherein:

FIG. 1 is a schematic side elevation showing the prefeeder, conveyor belt, and weight sensitive control means of the feeding apparatus according to this invention;

FIG. 2 is a perspective view of the feeding apparatus constructed according to the concepts of this invention;

FIG. 3 is an enlarged side elevation showing the belt conveyor means and the weight sensing means; and FIG. 4 is a plan view of the elements shown in FIG. 3.

In the illustrated embodiment of the invention, and with particular reference to FIG. 2, it is seen that the feeding apparatus comprises a main frame 10. A volumetric type feeder 12 is mounted on the frame 10, and as best seen in FIG. 1, the feeder has an upper inlet 14 for receiving material to be processed and a lower dispensing outlet 16 for dispensing the material 18 onto a conveyor belt 20. A suitable type of volumetric feeder for this purpose is described in detail in U.S. Patent No. 3,186,602 issued June 1, 1965.

The conveyor belt 20 is mounted in such a manner that the entire belt and its contents can be "sensed" or weighed by a force sensing load cell such as a low voltage differential transformer 22. As best seen in FIG. 2, the conveyor belt is carried by a pair of spaced rollers 24, one of which is driven as by means of a chain drive 26 from a motor 28. The rollers 24 are mounted on a conveyor support frame 30, and the material 18 passing along the conveyor belt 20 is protected by means of a top shield 32 and side shields 34 (one being shown).

In operation the material 18 passes from the feeder 12 through the outlet 16 to the conveyor belt 20 and is discharged therefrom as at 36 into a receiving hopper or container 38. As best seen in FIGS. 3 and 4, there is provided a balance beam indicated generally at 29. The conveyor support frame 30 is pivotally mounted on the front frame 40 of the balance beam 29 as by means of a pair of spaced flexure blocks 42 having pivot points 44. The conveyor support frame 30 is provided with a transverse member 48 which is fixedly attached to a pair of vertical stabilizer bars 50. The vertical stabilizer bars are pivotally connected to horizontal stabilizer bars 54 as at pivot points 52. The other ends of the horizontal stabilizer bars are pivotally connected to the frame 10 as by means of flexure pivot blocks 56 and pivot pins 58, respectively. The vertical and horizontal stabilizers are substantially frictionless, but they act to guide and retain the conveyor belt means in suspended position.

The balance beam 29 further comprises a balance beam center frame 60, FIG. 4, which is pivotally mounted on pivot supports 64 as by means of pivots 66. The pivot supports 64 are fixedly connected to the main frame as at 62.

The load cell 22 is fixedly connected to the main frame 10 as at 68, FIG. 3. The other end of the load cell is connected to the balance beam rear frame 70 as at 72, FIG. 3 so that any vertical movement of the balance beam 29 is due to the increase or decrease of material 18 on the belt conveyor 20 causes a corresponding movement of the load cell 22. Balance weights 74 are slidably mounted on the balance beam rear frame 70 for purposes of initially adjusting the balance mechanism. A fluid dash pot 76 is fixedly connected to the main frame 10 as at 78, FIG. 3 for purposes of dampening the balance mechanism during operation.

As best seen in FIG. 1, the load cell 22 is a device which translates mechanical displacement into a directly proportional signal. The signal is then converted and amplified to a useable level. This amplified output is also exactly related to the mechanical displacement of the load cell, and thus can be used for the visual monitoring of the weight variation of the material being processed by means of an indicator meter 80 which is calibrated to give the rate flow of material in weight per unit of time. Also this same signal is transmitted to a controller 82. Set point signal means 84 is calibrated for manual adjustment by the operator to set the desired feed rate of the apparatus in pounds per unit of time. This setting is transmitted to the controller 82. The controller compares the signal received from the load cell 22 with the manually set desired feed rate signal, and the controller transmits a signal to a variable speed motor 86 corresponding to whether the amplified output is greater or less than the set point signal. The variable speed motor 86 drives the volumetric feeder 12 depending upon the signal received from the controller 82, thereby controlling the rate of passage of material through the volumetric prefeeder 12.

In summary the operation of the apparatus is as follows: the volumetric prefeeder 12 discharges material onto the conveyor belt 20. The weight of material 18 on the belt is "sensed" by the load cell 22 which, in turn, compares it through the controller 82 with a desired or preset feed rate of the set point signal means 84. If the weight is more or less than required, the controller signals the feeder to increase or decrease its output by means of the variable speed drive motor 86 in order to bring the weight of the material on the belt to correspond to the selected feed rate. The accuracy of this system is generally of the order of about plus or minus ½% of the preset feed rate.

The set point signal means 84 and the feed rate indicator 80 are mounted on a control panel 88. Also, a total feed rate indicator 90 can be mounted on the control panel 88. This indicator receives a signal directly from the load cell 22 and is adapted to indicate the total feed weight over a prescribed period of time.

It will thus be seen that the present invention does indeed provide an improved apparatus for feeding and metering dry comminuted material and effectively meets the objects specified hereinbefore.

Although a certain particular embodiment of the invention is herein disclosed for purposes of explanation, further modifications thereof, after study of this specification, will be apparent to those skilled in the art to which the invention pertains. Reference should accordingly be had to the appended claims in determining the scope of the invention.

What is claimed and desired to be secured by Letters Patent is:

1. Apparatus for feeding particulate solid material comprising a volumetric prefeeder, means for varying the volume output of said prefeeder, a conveyor support frame, a pair of spaced rollers, an endless conveyor belt mounted thereon, and motive means for driving at least one of said rollers, said rollers being mounted on said conveyor support frame and said conveyor belt being disposed to receive the output of said prefeeder at one end thereof and for discharging said material from the other end thereof, a balance beam having a front frame, a pair of spaced flexure blocks pivotally mounted on said front frame, said conveyor support frame being pivotally mounted on said flexure blocks, said conveyor support frame having a transverse member, a pair of spaced vertical stabilizer bars fixedly attached to said transverse member, a pair of horizontal stabilizer bars pivotally attached to said vertical stabilizer bars respectively, a main frame, flexure pivot blocks pivotally attached to said main frame and said horizontal stabilizer bars being pivotally attached to said flexure pivot blocks respectively, said vertical and horizontal stabilizer bars serving to guide and retain said endless conveyor belt in suspended position, pivot support mounted on said main frame, said balance beam being medially pivotally mounted on said pivot supports, said balance beam having a balance beam rear frame, a load cell mounted on said main frame in operative engagement with said balance beam rear frame for detecting vertical movement of said balance beam due to an increase or decrease of material on said endless conveyor belt, balance weights slidably mounted on the balance beam rear frame for initially adjusting the balance mechanism, a fluid dash pot mounted on said main frame in operative engagement with said balance beam rear frame, and control means responsive to said load cell for controlling said means for varying the volumetric output of said prefeeder, said control means including a feed rate indicator connected to said load cell, a total feed indicator connected to said load cell, a controller connected to said load cell, a feed rate set point signal means connected to said controller, said means for varying the volumetric output of said prefeeder being a variable speed motor, and said controller being connected to said variable speed motor.

2. Apparatus for feeding particulate solid material according to claim 1 further comprising a top shield mounted over said endless belt and side shields mounted adjacent the sides of said endless belt for protecting the material passing therealong.

References Cited

UNITED STATES PATENTS

| 2,100,315 | 11/1937 | Harper | 222—55 |
| 2,276,383 | 3/1942 | Francis | 222—55 |
| 2,618,406 | 11/1952 | Kast | 222—55 |
| 2,619,256 | 11/1952 | Wiley | 222—63 X |
| 2,662,665 | 12/1953 | Harder | 222—55 |
| 2,932,430 | 4/1960 | Dennis | 225—55 |
| 3,062,408 | 11/1962 | Boudan | 222—55 |
| 3,139,216 | 6/1964 | Mell | 222—55 |
| 3,162,325 | 12/1964 | Hall et al. | 222—55 |
| 3,253,744 | 5/1966 | MacPherson et al. | 222—56 |

SAMUEL F. COLEMAN, Primary Examiner

F. R. HANDREN, Assistant Examiner

U.S. Cl. X.R.

177—16, 121; 198—39; 222—55, 56, 63